March 28, 1967
R. J. ROGENSKI
3,311,353
BEVERAGE MIXER
Filed Oct. 21, 1965
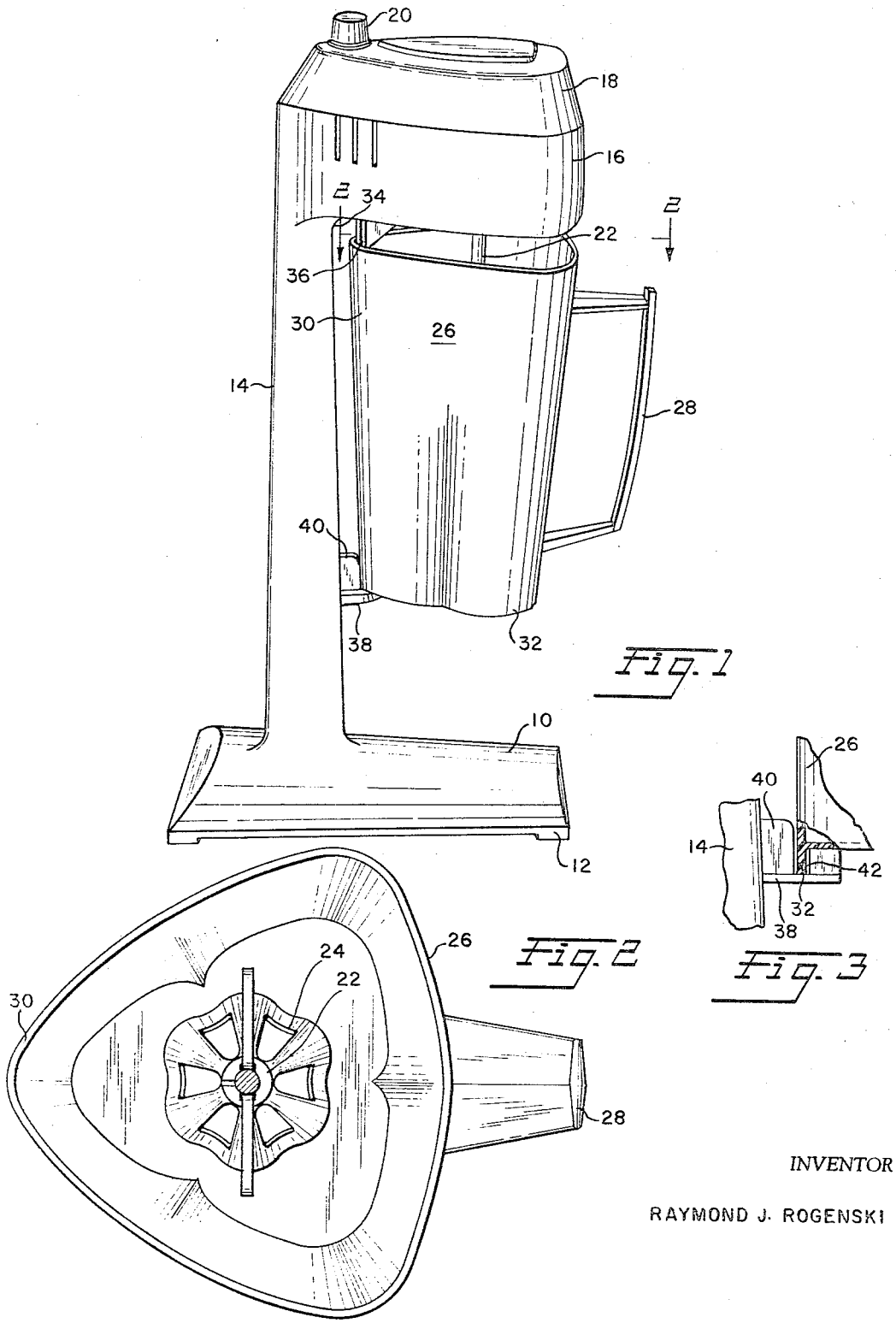
INVENTOR
RAYMOND J. ROGENSKI United States Patent Office 3,311,353
Patented Mar. 28, 1967

3,311,353
BEVERAGE MIXER
Raymond J. Rogenski, Torrington, Conn., assignor to Dynamics Corporation of America, New York, N.Y., a corporation of New York
Filed Oct. 21, 1965, Ser. No. 499,792
2 Claims. (Cl. 259—108)

The present invention is concerned with improvements in electric motor driven liquid or beverage mixers.

The principal object of the present invention is to provide a very simple and inexpensive beverage mixer readily operable even by children for quickly making their favorite milk shakes, malteds, etc.

Another principal object of the invention is to provide a mixer having an upright support for an electric motor, beater means depending from the motor and a beverage mixing cup which is readily positioned upon and removable from the upright support.

Other and further objects and advantages will be apparent from the following detailed description when taken in conjunction with the accompanying drawings wherein a preferred embodiment of the invention has been selected for exemplification.

In the drawings:

FIG. 1 is a perspective side elevational view of an electric motor driven beverage mixer constructed in accordance with the invention;

FIG. 2 is a top plan view of the cup portion of the mixer taken along the line 2—2 of FIG. 1; and FIG. 3 is a detailed fragmentary view showing the means supporting the bottom of the cup upon the standard.

Referring more particularly to the drawings wherein like numerals refer to like parts, the device, as shown, comprises a supporting base 10, preferably having frictional supporting feet 12, an upright standard 14 and an electric motor housing 16 extending transversely over the base 12. A removable cap 18 for access to the electric motor is positioned over the housing 16 and switch control means 20 projects outwardly for convenient manual access above the cap 18. For reasons of simplicity and economy, base 10, standard 14 and motor housing 16 may be integrally formed such as by molding as a single unit.

As shown, a shaft 22 depends from the electric motor for rotating beater or mixing means 24. The particular beater means 24 as indicated in FIG. 2 may be as illustrated and described in my copending application entitled, Rotatable Beater Assembly, filed concurrently herewith but it is to be understood that any other type of beater may be employed.

The container or cup member 26 may have a handle 28 formed integrally therewith. Cup 26 is preferably of lobular triangular configuration in cross-section as best shown in FIG. 2 and includes a forward pouring spout portion 30 opposed to the handle 28. Cup 26 also has an integrally formed depending skirt portion 32 at its base.

For supporting the top of the cup 26 upon the upright standard 14 for operatively receiving the beater means 24 depending from the shaft 22, an arcuate guide 34 for the outer wall of the lip of the pouring mouth 30 of the cup projects inwardly of the standard 14 and a depending retaining flange 36 opposed thereto depends from the motor housing 16 to bear against the inner wall portion of the pouring spout 30 when the cup is in operative mixing position.

For supporting the bottom of the cup 26 upon the standard 14, a shelf member 38 projects laterally and inwardly of the standard 14 and includes an inner stop plate 40 and an outer retaining flange 42 between which the skirt portion 32 of the cup 26 is adapted to seat.

It will be apparent that when the cup 26 is to be operatively positioned, it is thrust upwardly at an angle against the guide 34 to position its upper lip between the retaining flange 36 and the guide and then lowered downwardly so that its depending skirt 32 is seated on the shelf 38 between the guide 40 and the retaining flange 42 in substantially vertical alignment with the motor shaft 22 and its beater means 24. The cup 26 is just as readily removable from the standard 14 at the conclusion of the mixing operation by raising it sufficiently to free the skirt 32 from the retaining flange 42 and then withdrawing the cup outwardly and downwardly.

It will also be apparent from the foregoing that the device of the present invention provides a very simple and inexpensive beverage mixer for use as a household appliance or elsewhere.

It is to be understood that the present invention is not confined to the precise construction and arrangement of parts as herein illustrated and described but embraces all such modifications thereof that come within the scope of the following claims.

I claim:
1. An electric motor driven mixer which comprises,
    a base including an upright standard supporting an electric motor housing and a depending shaft driving a mixing means;
    a container for material to be mixed by said mixing means;
    arcuate guide means carried by the upper portion of said standard and an opposed flange depending from said motor housing for engaging the top of said container and for retaining the top of said container in operative position;
    a shelf projecting laterally and inwardly from the lower portion of said standard for supporting the bottom of said container;
    and opposed upright guide and flange means carried by said shelf for retaining the bottom of said container in operative position.
2. The device of claim 1 wherein the container is substantially of a plural lobular configuration in cross-section, one of said lobes forming a forward pouring spout, and the container is supported on said upright standard by said forward pouring spout.

References Cited by the Examiner
UNITED STATES PATENTS

| | | | |
|---|---|---|---|
| 1,465,629 | 8/1923 | Gilchrist | 259—134 |
| 2,065,440 | 12/1936 | Flaum et al. | 259—104 |
| 2,136,355 | 11/1938 | Fredenhagen | 259—135 |
| 2,699,924 | 1/1955 | Volkmar | 259—108 |
| 2,774,579 | 12/1956 | Brown et al. | 259—131 |
| 2,815,194 | 12/1957 | Seyfried et al. | 259—130 |
| 2,832,575 | 4/1958 | Cirone | 259—108 |

WALTER A. SCHEEL, Primary Examiner.
R. W. JENKINS, Assistant Examiner.